United States Patent
Furlani et al.

(12) 
(10) Patent No.: US 6,594,683 B1
(45) Date of Patent: *Jul. 15, 2003

(54) METHOD, APPARATUS AND COMPUTER PROGRAM PRODUCT FOR LOCKING INTERRELATED DATA STRUCTURES IN A MULTI-THREADED COMPUTING ENVIRONMENT

(75) Inventors: John L. Furlani, Palo Alto, CA (US); Alexander R. Ohlson, Palo Alto, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/398,915

(22) Filed: Sep. 16, 1999

Related U.S. Application Data

(63) Continuation of application No. 09/012,683, filed on Jan. 23, 1998.

(51) Int. Cl.[7] .................................................. G06F 9/00
(52) U.S. Cl. ........................ 709/102; 709/100; 709/104; 711/145
(58) Field of Search ................................ 709/100, 101, 709/102, 103, 104, 105, 106; 711/141, 145; 710/240, 242, 244

(56) References Cited

U.S. PATENT DOCUMENTS 5,995,998 A * 11/1999 Furlani et al. .............. 709/102

* cited by examiner

*Primary Examiner*—Majid Banankhah

(57) ABSTRACT

Apparatus, methods, and computer program products are disclosed that improve the performance of multi-threaded computer applications that use objects (within an object collection) which require exclusive thread access. The invention monitors interrelationships between the objects in the object collection and provides mechanisms to lock the minimal set of these objects for the exclusive thread access. When these objects are locked, independent or unrelated objects are left unlocked and can, in turn, be locked by other threads. Because a minimal set of objects are locked other threads that access the object collection are less likely to be blocked by the lock. Thus, these other threads are more likely to be able to simultaneously access objects in the object collection.

45 Claims, 11 Drawing Sheets

METHOD, APPARATUS AND COMPUTER PROGRAM PRODUCT FOR LOCKING INTERRELATED DATA STRUCTURES IN A MULTI-THREADED COMPUTING ENVIRONMENT

CROSS REFERENCE TO RELATED APPLICATION

This application is a continuation of copending prior application Ser. No. 09/012,683, filed on Jan. 23, 1998, which is now pending. This prior application is incorporated in its entirety herein by this reference thereto.

BACKGROUND OF THE INVENTION

1. Field of the Invention

This invention relates to the field of locking data structures in a multi-threaded computing environment. Specifically, this invention is a method, apparatus, and computer program product for locking interrelated groups of data structures in a multi-threaded computing environment.

2. Background

Data structures contain organized information in a computer's memory. Each of these data structures can be independent or interrelated to other data structures. Access to the data structures is simple when the access occurs in a computing environment that has a single flow of execution (thread-of-execution) because the data in the interrelated data structures is always consistent during the execution of the single thread. However, if an asynchronous operation occurs (such as an interrupt, process context switch or similar operation that allows for concurrent access to the data structure) the contents of the data structure may be made inconsistent if an asynchronous operation changes the data structure while another operation is accessing the data structure. Modern computing systems often use threads-of-execution to parallelize computer operations.

A thread-of-execution (a thread) is a sequence of control within a programmed-process. A traditional single-threaded programmed-process follows a single sequence-of-control while executing. A multithreaded programmed-process has several sequences of control, and is capable of several independent actions. A particular implementation of a multi-threaded computing environment is discussed in *SunOS Multi-thread Architecture,* by Powell, Kleiman, Barton, Shah, Stein and Weeks, USENIX, Winter 1991, page 65. Posix® threads are described in *Programming with POSIX Threads,* by David R. Butenhof, © 1997 by Addison Wesley Longman, Inc., ISBN 0-201-63392-2, pages 35–95.

The subsequently disclosed invention is described within the context of an object-oriented programming (OOP) paradigm. The OOP paradigm uses objects. Objects associate an object's data with OOP methods for operating on that object's data. Usually, OOP objects are instantiated in a heap memory area and are based on classes that reference the programmed methods for the OOP object. Instantiated OOP objects are accessed through pointers and contain data (in instance variables) specific to that particular instantiated OOP object. Conceptually, an OOP object contains object-related information (such as the number of instance variables in the object), data structures for storing the object's instance variables, and addresses of called-routines (OOP methods) that access and/or manipulate the contents of the instance variables in the object. However, because objects often share called-routines and object-related information, this shared information is usually extracted into a class. Thus, the instantiated object simply contains its instance variables and a pointer to its class. Further information about OOP concepts may be found in *Not Just Java* by Peter van der Linden, Sun Microsystems Press/Prentice Hall PTR Corp., Upper Saddle River, N.J., (1997), ISBN 0-13-864638-4, pages 136–149.

Data structures also can be treated as objects within the OOP paradigm. Such data structure objects include the instantiated data that make up the data structure, programmed methods to access this data and potentially links to other data structure objects.

A useful data structure for image processing purposes (and many other purposes) is a modified directed acyclic graph (DAG) that represents images and the operations applied to these images. The DAG elements can be represented as objects. One or more DAGs can be constructed by an imaging library as the library captures a series of imaging operations directed to one or more source images. The resulting DAGs are contained within an object collection. The object collection generally contains both independent and interrelated DAG objects. Independent objects are those that do not depend on other objects. Interrelated objects access each other to perform their operation. An independent object can be locked by a thread to assure exclusive access to the thread. However, to lock an interrelated object, each interrelated object must also be locked to assure that the information in the object is not changed by a second thread while a first thread is processing One prior art approach to locking objects uses a mutex to serialize thread access to the object collection. The difficulty with this approach is that while one thread processes objects in the object collection other threads cannot. Thus, independent operations, controlled by threads, that need to access an object in the object collection cannot make the access until the locking thread releases the object collection. This approach limits the advantages of a multi-threaded computing environment by making the object collection a blocking resource.

Another prior art approach assigns a mutex (generally within a control object) to serialize access to each group of objects that may be interrelated in the object collection. Thus, the object collection may have multiple control-objects each controlling access to an independent group of the object collection where each group contains objects that may be interdependent. The difficulty with this prior art approach is that the control-object is used to control access to a group of objects that are believed to be interrelated but often are not actually interrelated. This means that the control-objects are over inclusive and lock more than the required objects. This results in increased thread blocking and thus reduced performance.

It would be advantageous to monitor which objects in the object collection are actually interrelated and thus use each control object to limit access to the minimal group of the interrelated objects.

SUMMARY OF THE INVENTION

The present invention improves the performance of a multi-threaded computer application that uses groups of interrelated data structures containing values that must be exclusively accessed by a thread. The invention monitors interrelationships between the data structures and provides mechanisms to lock the minimal set of data structures needed for the exclusive thread access. The invention only locks interrelated data structures comprising a group while leaving independent data structures or unrelated groups of data structures unlocked and available to other threads. Because the group contains a minimal set of interrelated data structures, when the group is locked other threads are less likely to be blocked by the lock. Thus, these other threads are more likely to be able to simultaneously process data structures in other groups.

One aspect of the invention is a computer controlled method for locking an object-of-interest in an object collection without keeping a non-interrelated object locked. The object collection is accessed by one or more threads in a multi-threaded computing environment. A group lock controls thread access to a respective group of interrelated objects containing the object-of-interest. The method includes the step of associating a reference lock with the object collection to control thread access to a plurality of group lock linkages used by the group lock. The method also includes the step of modifying the plurality of group lock linkages responsive to a change of relationship between a first object within the respective group of interrelated objects with a second object. An additional method step is of locking the respective group of interrelated objects, containing the object-of-interest. Thus, this step locks the object-of-interest and its interrelated objects.

Another aspect of the invention is an apparatus, having a central processing unit (CPU) and a memory coupled to said CPU, for locking an object-of-interest in an object collection without keeping a non-interrelated object locked. The object collection is accessed by one or more threads in a multi-threaded computing environment. A group lock controls thread access to a respective group of interrelated objects containing the object-of-interest. The apparatus includes a reference lock mechanism that is configured to associate a reference lock with the object collection such that the reference lock mechanism controls thread access to a plurality of group lock linkages used by the group lock. The apparatus also includes a group modification mechanism that is configured to alter the respective group of interrelated objects. This alteration is accomplished by changing the relationship between a first object within the respective group of interrelated objects with a second object. In addition, the apparatus includes a group locking mechanism that is configured to lock the respective group of interrelated objects, containing said object-of-interest, thereby locking said object-of-interest and its interrelated objects.

Yet a further aspect of the invention is a computer program product embedded on a computer usable medium for causing a computer to lock an object-of-interest in an object collection without keeping a non-interrelated object locked. The object collection is accessed by one or more threads in a multi-threaded computing environment. A group lock controls thread access to a respective group of interrelated objects that contains the object-of-interest. When executed on a computer, the computer readable code causes a computer to effect a reference lock mechanism, a group modification mechanism and a group locking mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1:
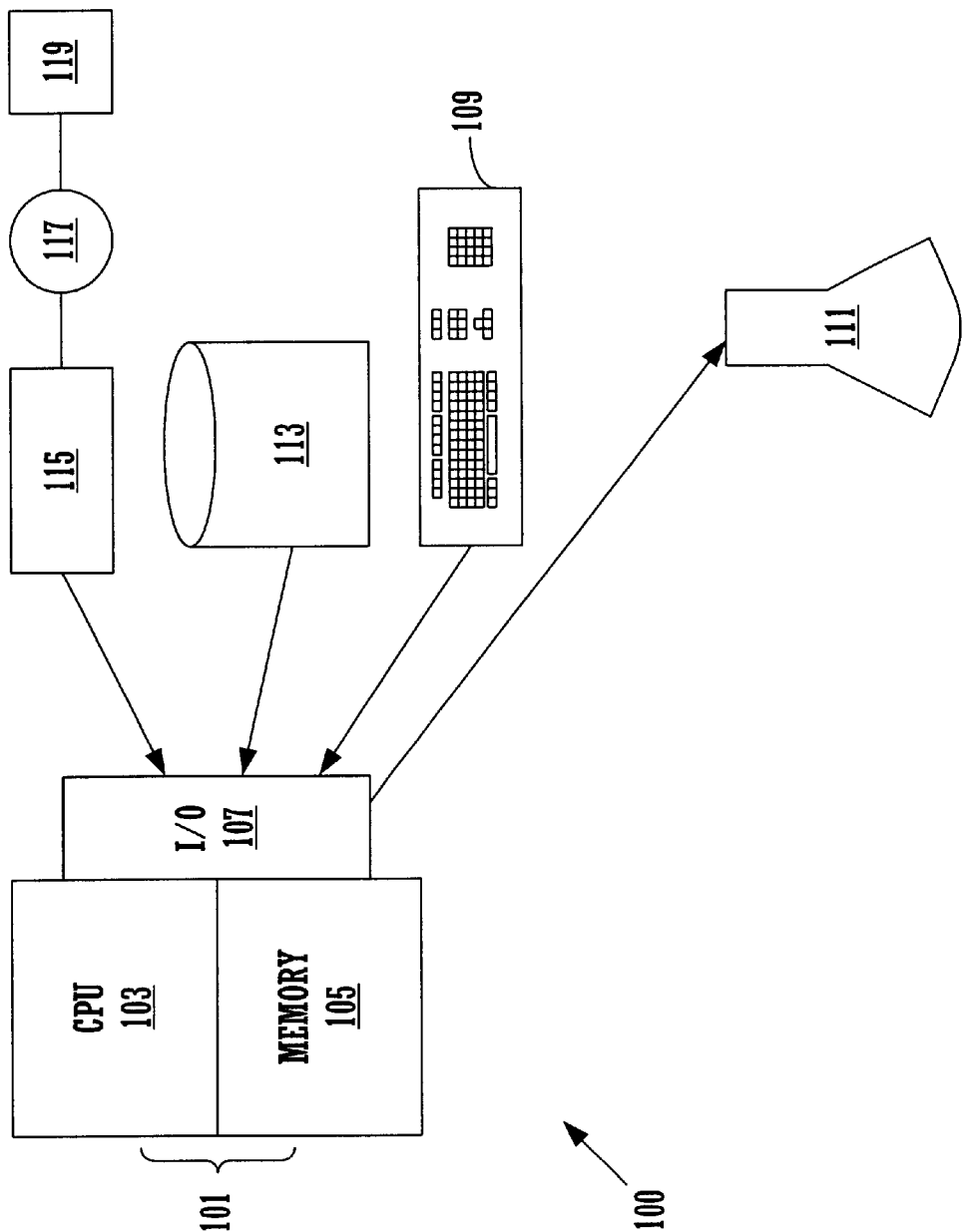
FIG. 1 illustrates a computer system capable of using the invention in accordance with a preferred embodiment.

The following 'notations and nomenclature' are provided to assist in the understanding of the present invention and the preferred embodiments thereof.

Condition Variable—A condition variable is a conditional thread synchronization mechanism. A condition variable allows a thread to acquire a mutex, test a condition, release the mutex and be suspended if the condition is FALSE. The thread is resumed when the condition becomes TRUE and again acquires the mutex. Thus, the thread tests a condition and when the condition is satisfied the thread acquires the mutex and continues processing.

Data Structure—A data structure is an ordered arrangement of storage in memory for variables. A data structure is generally included within an OOP object.

Mutex—A mutex (mutual exclusion lock) is a thread synchronization primitive. The first thread to invoke the mutex acquires the mutex. Further invocations of the mutex cause the invoking thread to block. The thread that has acquired the mutex can then release the mutex. Once the mutex is released (unlocked) the blocked threads contend to acquire the mutex.

Object—An object in the object oriented programming paradigm is an association between programmed methods and the data structures defined by a class and the instantiated storage that represents an object of the class.

Object collection—An object collection is a collection of OOP objects (that contain programmed methods and data structures). In a preferred embodiment the object collection contains objects that contain directed acyclic graphs (DAG) used for image processing.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Programmed method—A programmed method is a programmed procedure associated with an object. The programmed method is invoked to cause the object to perform an operation. In the procedural programming paradigm a programmed method is equivalent to a programmed routine or function.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

One skilled in the art will understand that although the following description of the invention is cast within an object oriented paradigm, the techniques disclosed are applicable to other programming paradigms.

A preferred embodiment uses a modified directed acyclic graph (DAG) to represent images and the operations applied to these images. One skilled in the art will understand that data structures other than a DAG can be used with similar results. The DAG is constructed by an imaging library as the library captures a series of imaging operations. One skilled in the art will understand that the invention can be practiced in field other than image processing and that the invention can be applied to objects and data structures other than ones subsequently used to illustrate the use of the invention.

The invention uses a computer. Some of the elements of a computer, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 111, a disk storage unit 113 and a CD-ROM drive unit 115. The CD-ROM drive unit 115 can read a CD-ROM medium 117 that typically contains a program and data 119. The CD-ROM drive unit 115, along with the CD-ROM medium 117, and the disk storage unit 113 comprise a filestorage mechanism. One skilled in the art will understand that the CD-ROM drive unit 115 can be replaced by a floppy disk, magnetic tape unit or similar device that accepts a removable media that can contain the program and data 119. Such a computer system is capable of executing applications that embody the invention.

Figure 2A:
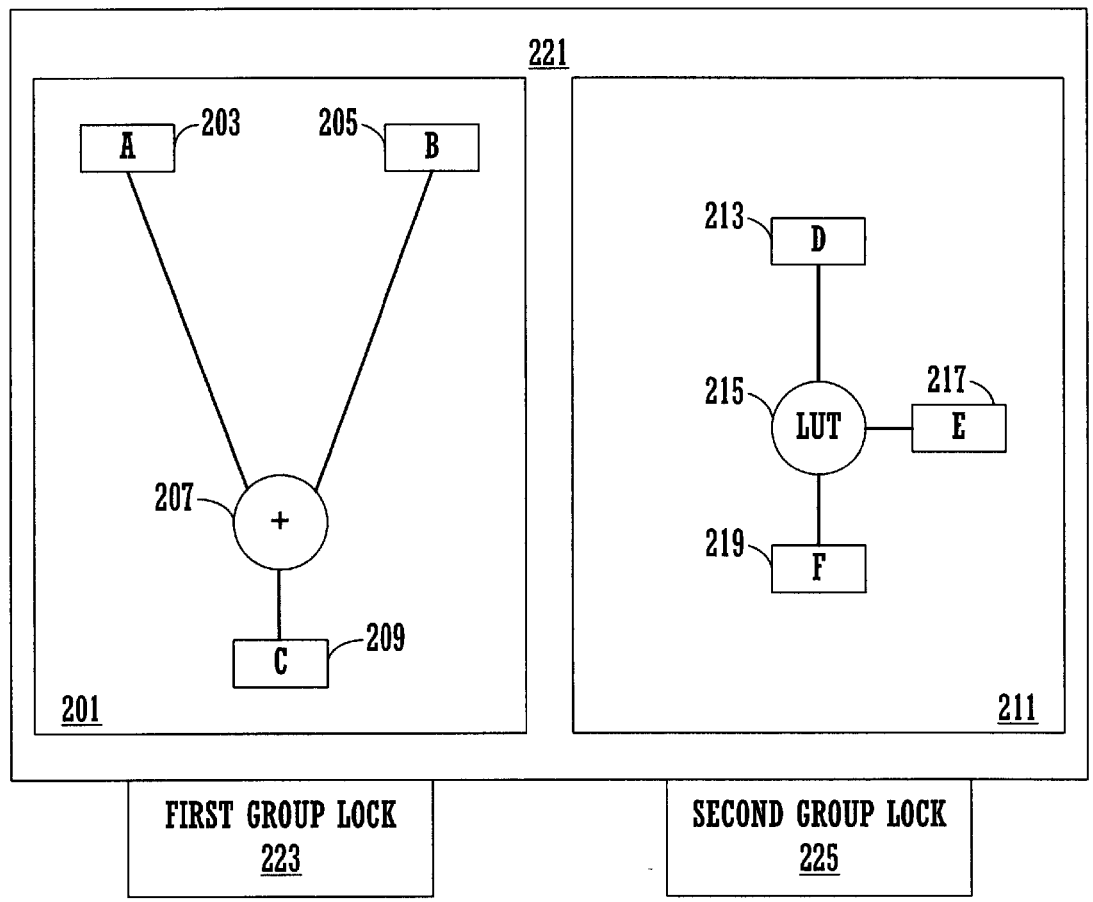
FIG. 2A illustrates an object collection with two groups of interrelated objects in accordance with a preferred embodiment.

FIG. 2A illustrates a grouped object collection, indicated by general reference character 200, that includes two independent groups that each contain interrelated objects. The two groups can be processed in parallel by separate threads. In this example, a 'first group of interrelated' objects 201 includes a 'first image' object 203 used to represent a first image, a 'second image' object 205 used to represent a second image, a 'summation operation' object 207 used to represent an image operation that generates the sum of the 'first image' object 203 and the 'second image' object 205. This summed image is represented by a 'first result image' object 209. One skilled in the art will understand that each of the objects in the 'first group of interrelated' objects 201 are related to each other through the 'summation operation' object 207 and that a thread that executes the operation represented by the 'summation operation' object 207 must have exclusive access to the entire group of objects 203, 205, 207, 209.

A second group of interrelated objects 211, independent from the 'first group of interrelated' objects 201, includes a 'third image' object 213 and a 'LUT operation' object 215 that accesses a 'look up table data' object 217. The 'LUT operation' object 215 operates on the 'third image' object 213 using the 'look up table data' object 217 to generate a 'second result image' object 219. In a manner similar to the 'first group of interrelated' objects 201, each of the objects in the second group of interrelated objects 211 are interrelated. Thus, a thread that executes the operation represented by the 'LUT operation' object 215 must have exclusive write access to the entire group of objects 213, 215, 217, 219. The objects in the 'first group of interrelated' objects 201 and the second group of interrelated objects 211 make up an object collection 221. Because the two groups are independent of each other (in that the objects of one group are non-interrelated object with respect to the objects in the other group) they can be accessed by separate threads. The 'first group of interrelated' objects 201 can be locked by a 'first group lock' object 223. The second group of interrelated objects 211 can be locked by a 'second group lock' object 225. The links that interrelate the group locks and the objects in the object collection 221 can be locked by a 'reference lock' object 227. Each of the lock objects is subsequently described.

It is now useful to summarize the use of the reference and group locks. These locks are contained in non-interrelated objects. These lock objects are not interrelated with the object-of-interest or objects within a group because the lock objects are a result of the interrelationships between the objects in a group but are not themselves members of a group (nor do the lock objects need to be within the object collection). To access an independent object a thread acquires a lock on that object. To access an interrelated object the thread acquires the related group lock (such as the 'first group lock' object 223) and the object lock. To change the relationship between objects and/or groups the thread acquires the 'reference lock' object 227. Thus, a thread must first acquire the 'first group lock' object 223 to perform the operation represented by the 'summation operation' object 207.

Figure 2B:
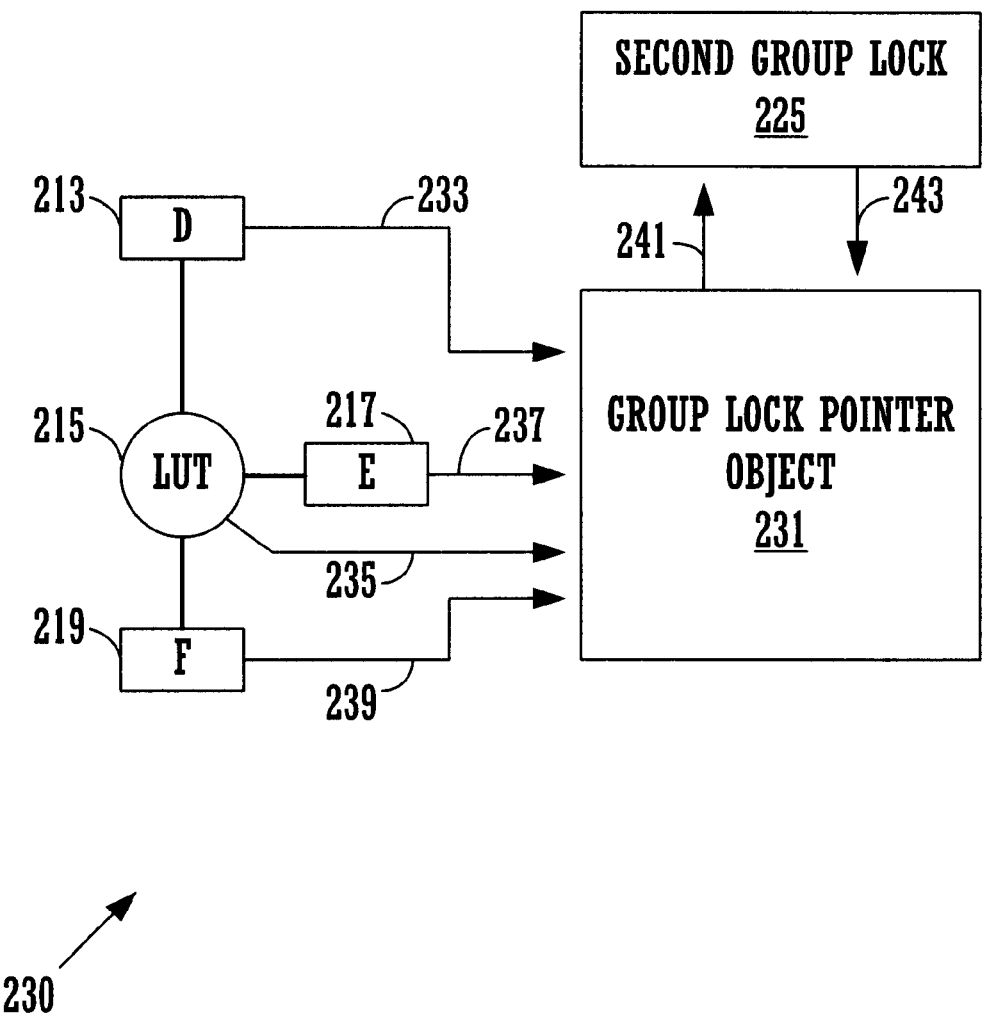
FIG. 2B illustrates a group linkage structure in accordance with a preferred embodiment.

FIG. 2B illustrates a group linkage structure, indicated by general reference character 230, for associating interrelated objects with a group. This example indicates how the second group of interrelated objects 211 is associated with the 'second group lock' object 225. Each object 213, 215, 217, 219 in the second group of interrelated objects 211 includes a pointer to a 'group lock pointer' object 231. Thus, the 'third image' object 213 includes a 'third image' link 233 that points to the 'group lock pointer' object 231. In a similar manner, the 'LUT operation' object 215 includes a 'LUT operation' link 235; the 'look up table data' object 217 includes a 'look up table data' link 237; and the 'second result image' object 219 includes a 'second result image' link 239; each pointing to the 'group lock pointer' object 231. The 'group lock pointer' object 231 includes a group link 241 to the 'second group lock' object 225. In addition, the 'second group lock' object 225 includes a reverse group link 243. One skilled in the art will understand that the previously described linkages enables each object 213, 215, 217, 219 in the group to be attached to a different group by changing the pointer value in the 'group lock pointer' object 231 (along with appropriate modifications to the 'second group lock' object 225 and the reverse group link 243) and thus change the group link 241 from one group lock to another group lock without changing the links for each object 213, 215, 217, 219.

Often two independent groups of interdependent objects become themselves interdependent. In this circumstance the groups and their group locks must be merged.

Figure 2C:
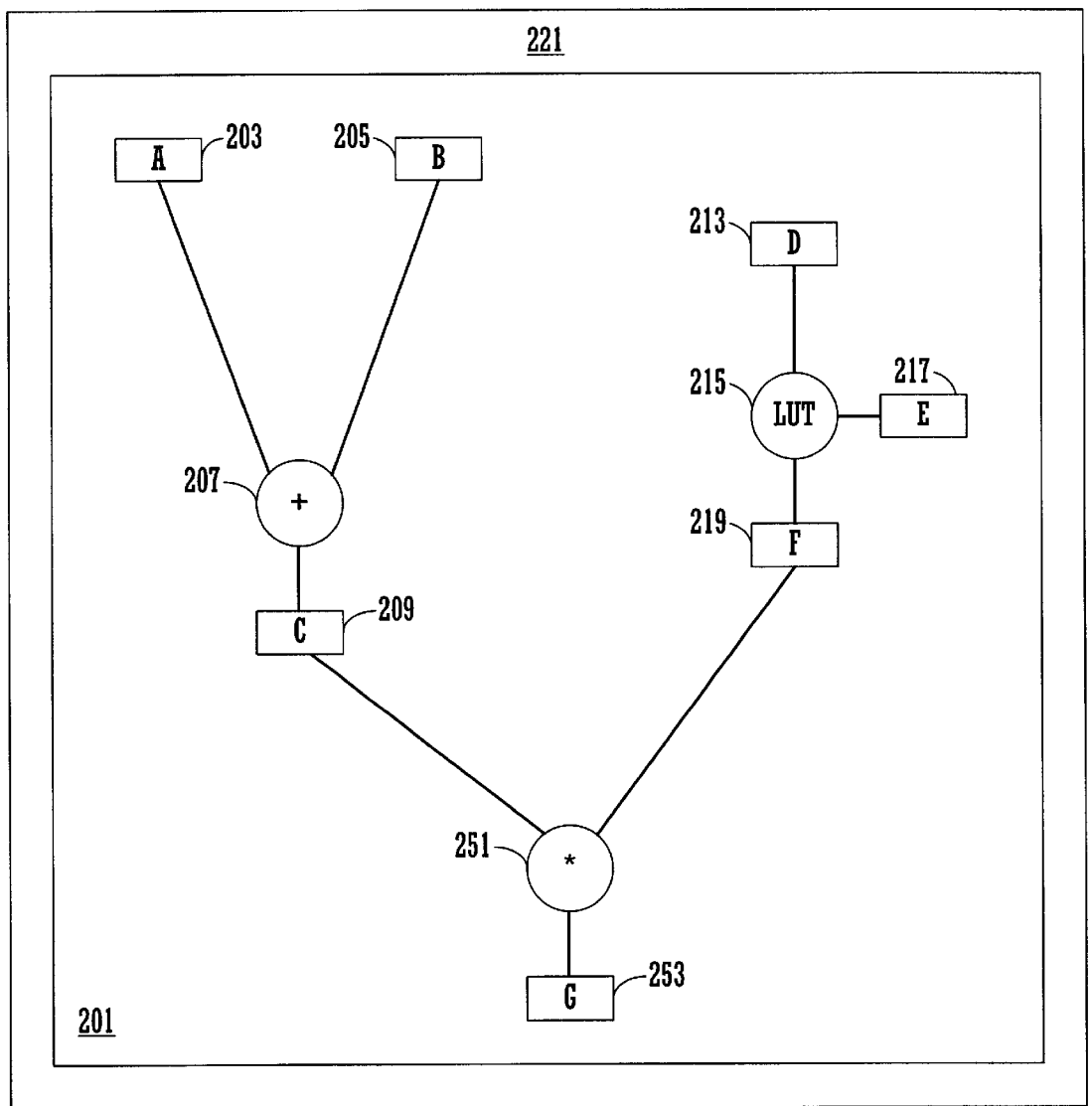
FIG. 2C illustrates a merged group in accordance with a preferred embodiment.

FIG. 2C illustrates an object collection, indicated by general reference character 250, that is the result of merging the 'first group of interrelated' objects 201 with the second group of interrelated objects 211. These two groups became interrelated by the insertion of an 'image multiplication' object 251 that multiplied the 'first result image' object 209 with the 'second result image' object 219 to generate a 'third result image' object 253. Because the 'image multiplication' object 251 interrelated the 'first group of interrelated' objects 201 with the second group of interrelated objects 211, the two groups must be merged into one group. This is accomplished, as is subsequently described with respect to FIG. 6, by changing the value of the 'group lock pointer' object 231 for the second group of interrelated objects 211 to point to the 'first group lock' object 223. One skilled in the art will understand that generally there will be more than two groups of interrelated objects in the object collection.

Figure 3:
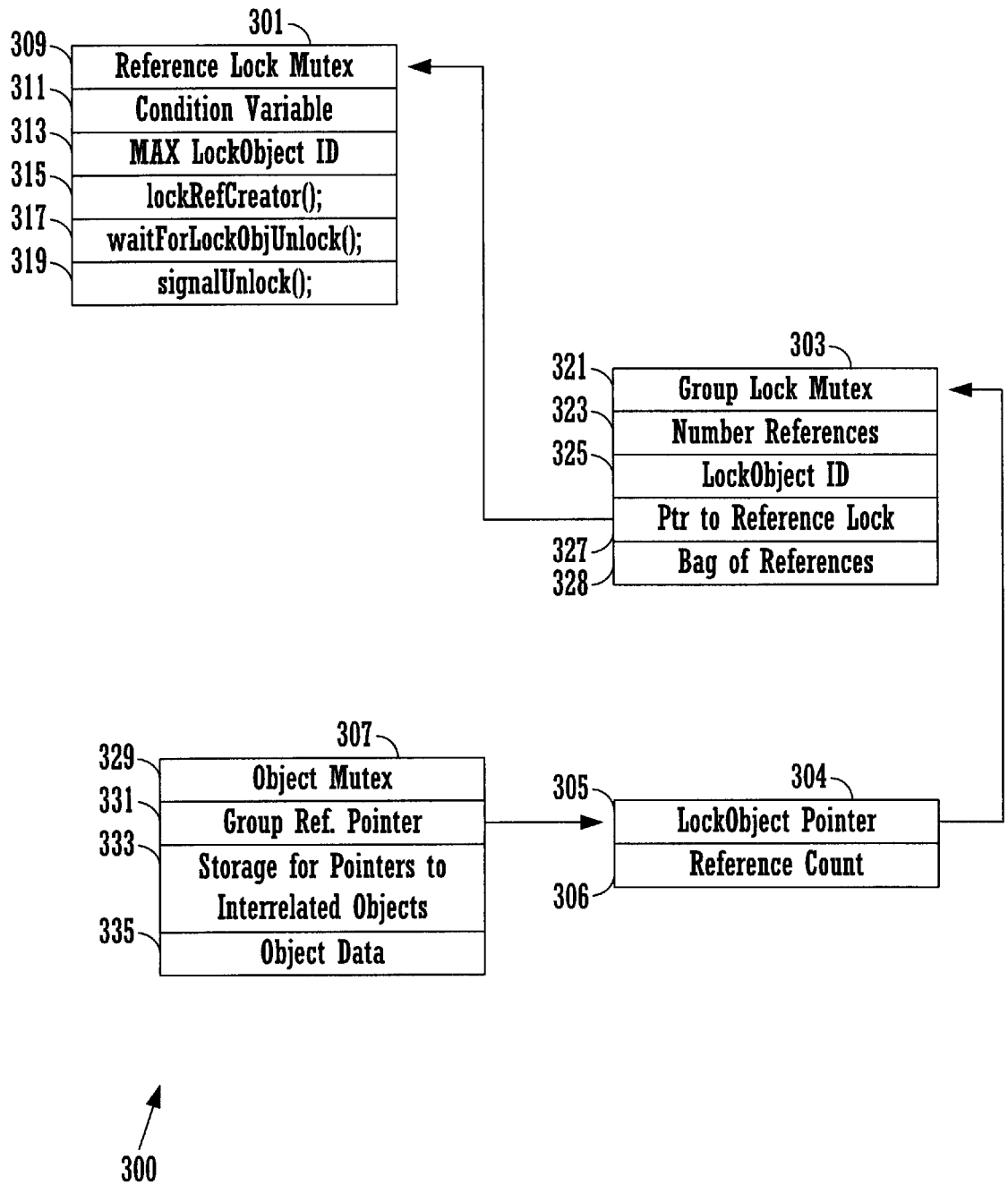
FIG. 3 illustrates a locking data structure in accordance with a preferred embodiment.

FIG. 3 illustrates a locking data structure, indicated by general reference character 300, used in one embodiment. The locking data structure 300 includes a 'reference lock' object 301, a 'group lock' object 303, a 'group lock pointer' object 304 (containing a 'lock object' pointer 305 and a 'reference count' field 306), and a lockable object 307. The 'reference lock' object 301 is used to provide exclusive access to subsequently described group lock linkages. The object collection may have more than one associated 'group lock' object 303. Each group in the object collection contains interrelated objects that must be locked together before accessing any of the interrelated objects. Thus, each group in the object collection can be independently accessed by separate threads. The 'group lock pointer' object 304 contains the 'lock object' pointer 305 to the 'group lock' object 303. Each interrelated object in the object collection contains a pointer to the 'group lock pointer' object 304 that in turn points to the 'group lock' object 303 for that group. Thus, each of the interrelated objects in a group can be assigned to a different 'group lock' object 303 by replacing the existing value of the 'lock object' pointer 305 with a pointer to the new 'group lock' object instead of traversing each object and updating its pointer. The lockable object 307 is an object within the object collection. In one preferred embodiment the 'reference lock' object 301, the 'group lock' object 303 and the 'group lock pointer' object 304 are not included within the object collection.

The 'reference lock' object 301 contains a 'reference lock' mutex 309 and a condition variable 311 that uses well-known techniques to serialize thread access. The 'reference lock' object 301 is used to obtain exclusive access to the group lock linkages. The 'reference lock' object 301 also contains a 'max lock object ID' field 313 that contains a monotonically increasing value used to uniquely identify lock objects. The 'reference lock' object 301 also contains programmed methods that provide functionality for the 'reference lock' object 301. These programmed methods include a lockRefCreator programmed method 315, a waitForLockObjUnlock programmed method 317, and a signalUnlock programmed method 319. The lockRefCreator programmed method 315 creates a new 'group lock' object 303 when an independent object in the object collection becomes interrelated to another object. The lockRefCreator programmed method 315 also increments and stores the value of the 'max lock object ID' field 313 in the newly created 'group lock' object 303. The waitForLockObjUnlock programmed method 317 is invoked by a threaded procedure to request exclusive access to the object collection and eventually results in the requesting thread receiving the 'reference lock' mutex 309 and exclusive access to the linkages in the object collection. The signalUnlock programmed method 319 is invoked to signal the release of the 'reference lock' mutex 309 indicating the thread no longer needs exclusive access to the linkages in the object collection.

The 'group lock' object 303 includes a group lock mutex 321 that is used to serialize thread access to a group of interrelated objects. To access the 'group lock' object 303 the program must first acquire the 'reference lock' object 301. The 'group lock' object 303 also includes a 'number of references' field 323 containing the number of the objects in the object collection controlled by the 'group lock' object 303. One skilled in the art will understand that the 'number of references' field 323 and the 'reference count' field 306 are used to respectively determine when the 'group lock' object 303 and the 'group lock pointer' object 304 are no longer used. The 'group lock' object 303 also contains a 'group lock identification' field 325 that contains a monotonically increasing identification value generated by the lockRefCreator programmed method 315 as previously described. The 'group lock' object 303 also includes a 'reference lock pointer' field 327 that contains a pointer to the 'reference lock' object 301. In addition, the 'group lock' object 303 includes a 'reference pointer' storage 328 that provides, or links to, a pointer to each 'group lock pointer' object 304 that references the 'group lock' object 303.

The lockable object 307 is one of the objects in the object collection. A program uses the objects that reside in the object collection to (without limitation) perform services or provide information to the program. The lockable object 307 includes an object lock mutex 329 that can be used to lock the lockable object 307. The lockable object 307 also contains a 'group reference pointer' field 331 that contains a pointer to the 'group lock pointer' object 304 belonging to the group of interrelated objects. The lockable object 307 also contains a 'pointers to interrelated objects' storage 333 that provides, or links to, storage for pointers to the objects that are interrelated with the lockable object 307. Thus, if a group contains both a first and second instance of the lockable object 307, each would reference a pointer to the other object through a pointer stored in the respective 'pointers to interrelated objects' storage 333. The lockable object 307 also contains an 'object data and programmed method' storage 335 that, in an object-oriented system, includes the objects instance variables and access means to the object's programmed methods.

The 'reference lock' object 301 protects the 'group lock' object 303, the 'lock object' pointer 305, and the 'group reference pointer' field 331 such that the thread that has acquired the 'reference lock' object 301 has exclusive access to these group lock linkages.

One skilled in the art will understand that the locking data structure 300 need not be implemented in an object-oriented manner and that traditional procedural data structuring techniques can be used to implement the previously described relationships and capabilities.

Figure 4:
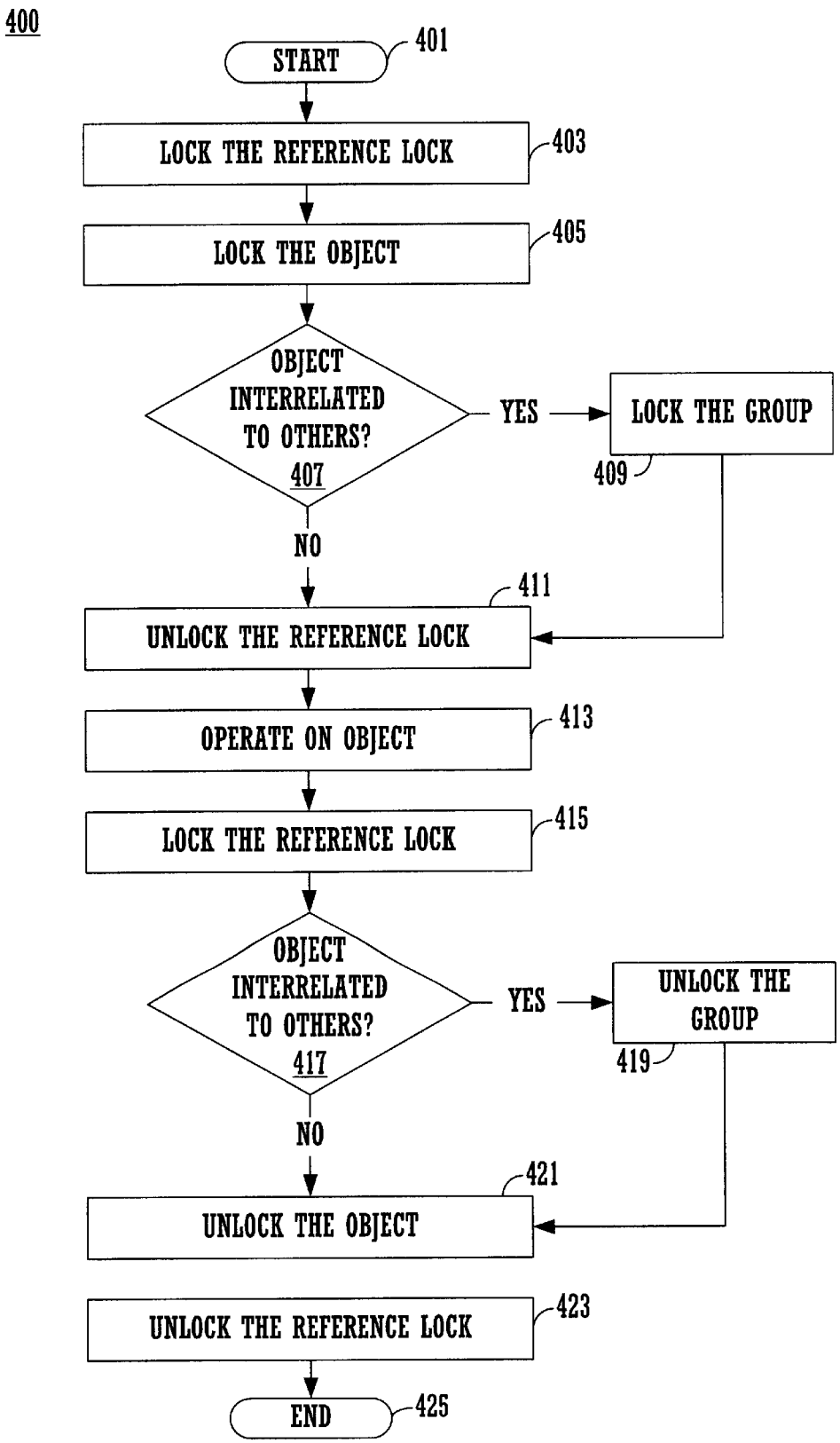
FIG. 4 illustrates an object locking process for obtaining exclusive thread access to the object in accordance with a preferred embodiment.

FIG. 4 illustrates an object locking process, indicated by general reference character 400, showing the steps used to lock an object-of-interest in the object collection. The process 400 initiates at a 'start' terminal 401 and continues to a 'lock reference lock' procedure 403. The 'lock reference lock' procedure 403 locks the 'reference lock' mutex 309 in the 'reference lock' object 301 to obtain exclusive thread access to the group lock linkages in the object collection (for example, the 'group lock' object 303) prior to accessing an object-of-interest such as the lockable object 307. Once a thread acquires the 'reference lock' mutex 309, the group and object interrelationships in the object collection are protected from access by other threads. Once these interrelationships are protected from other threads the current thread can change the interrelationships. Next the process 400 continues to a 'lock object' procedure 405 that acquires the object lock mutex 329 of the object-of-interest. Then an 'object interrelated' decision procedure 407 determines whether the lockable object 307 that will be accessed (the object-of-interest) is interrelated to other objects or whether it is independent of other objects. This determination is made by examining the 'group reference pointer' field 331 within the lockable object 307. If the 'group reference pointer' field 331 value does not contain a pointer to the 'lock object' pointer 305, the lockable object 307 is independent of other objects in the object collection. If the lockable object 307 is not independent, the process 400 continues to a 'lock group' procedure 409 that acquires the group lock mutex 321. Then the process 400 continues to an 'unlock reference lock' procedure 411. The 'unlock reference lock' procedure 411 is also directly executed if the 'object interrelated' decision procedure 407 determined that the object-of-interest was independent. The 'unlock reference lock' procedure 411 unlocks the 'reference lock' mutex 309. Next the process 400 continues to an 'operate on object' procedure 413 that performs the desired operation on the object-of-interest. Once the operation completes, the process 400 continues to a 'lock reference lock' procedure 415 that again locks the 'reference lock' mutex 309 to prohibit other threads from modifying group lock linkages in the object collection. Next, an 'object interrelated' decision procedure 417 again checks to determine whether the object-of-interest is independent or interrelated with other objects. If the object-of-interest is interrelated an 'unlock group' procedure 419 releases the group locked by the 'lock group' procedure 409. Once the group is unlocked, or if the object-of-interest was independent, the process 400 continues to an 'unlock object' procedure 421 that releases the object lock mutex 329 acquired by the 'lock object' procedure 405. Once the object-of-interest is unlocked, the process 400 continues to an 'unlock reference lock' procedure 423 that unlocks the 'reference lock' mutex 309 locked by the 'lock reference lock' procedure 415. The process 400 completes through an 'end' terminal 425.

Those skilled in the art will understand that the 'reference lock' object 301 is locked for a very short time to minimize delays to other threads that change relationships between objects and groups in the object collection.

Figure 5A:
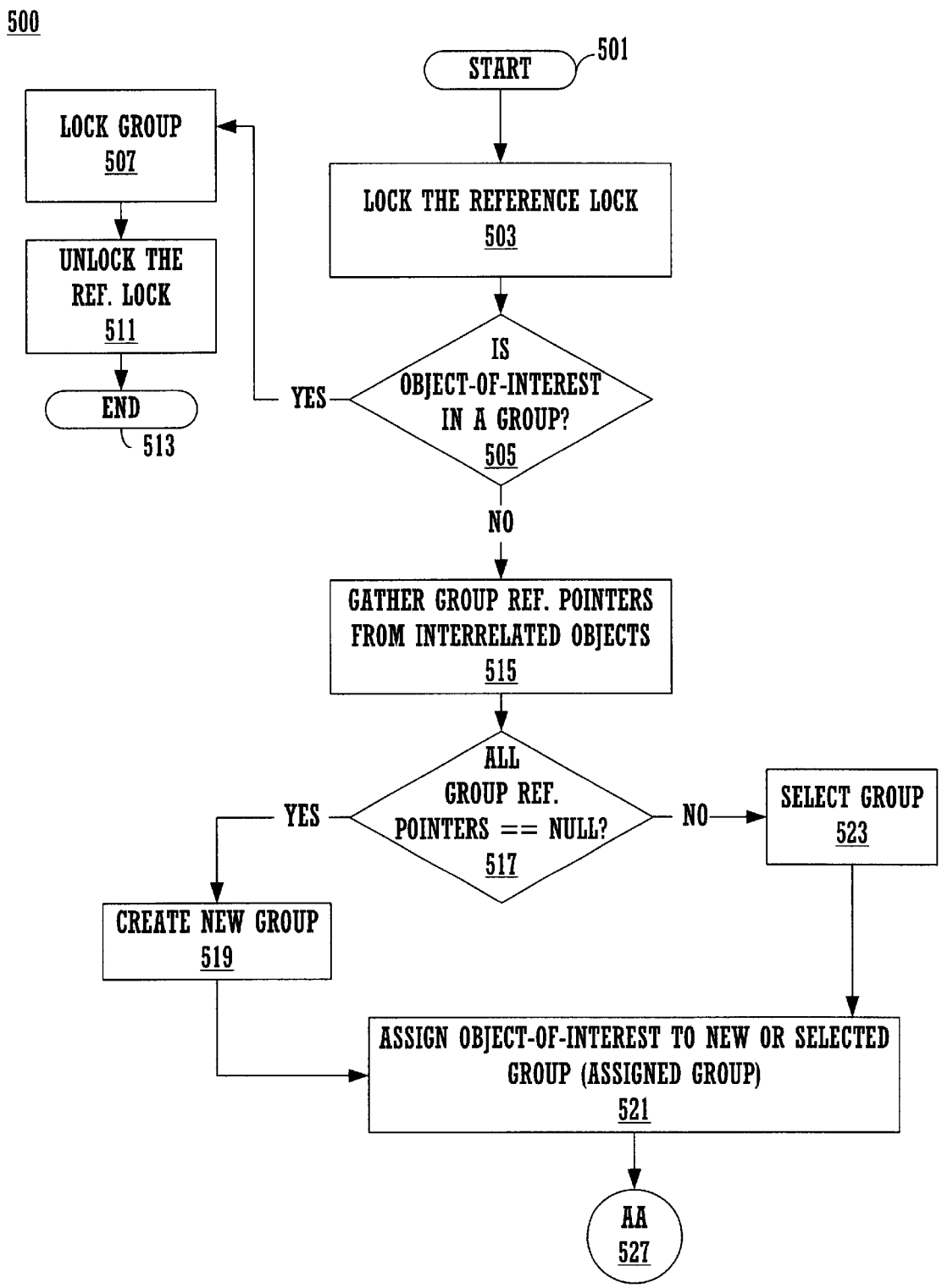
FIGS. 5A & B illustrate an insert-and-lock process in accordance with a preferred embodiment.

FIG. 5A illustrates an insert-and-lock process, indicated by general reference character 500, that inserts an object-of-interest into the object collection where the object-of-interest may interrelate another object. The insert-and-lock process 500 initiates at a 'start' terminal 501 and continues to a 'lock reference lock' procedure 503. The 'lock reference lock' procedure 503 locks the 'reference lock' object 301. Once the 'reference lock' object 301 is locked, the insert-and-lock process 500 determines whether the object-of-interest is independent or assigned to a group at an 'object-of-interest in group' decision procedure 505. This determination is made by examining the 'group reference pointer' field 331 in the object-of-interest. If the 'group reference pointer' field 331 is NULL, the object-of-interest is independent. Otherwise the object-of-interest belongs to some group. If the object-of-interest already belongs to a group, the insert-and-lock process 500 continues to a 'lock group' procedure 507 that locks the 'group lock' object 303 that contains the object-of-interest by locking the group lock mutex 321. Next an 'unlock reference lock' procedure 511 releases the 'reference lock' object 301 so that other threads can manipulate linkages between the objects in other groups. Then the insert-and-lock process 500 completes through an 'end' terminal 513.

However, if the 'object-of-interest in group' decision procedure 505 determines that the object-of-interest is not included within some group, the insert-and-lock process 500 continues to an 'gather group reference pointers' procedure 515. The 'gather group reference pointers' procedure 515 gathers the group reference pointers from each object that is interrelated to the object-of-interest. Next, an 'all group reference pointers NULL' decision procedure 517 determines whether all the group reference pointers in the interrelated objects are NULL. If all the group reference pointers are NULL, neither the object-of-interest nor any of its interrelated objects are assigned to a group. Thus, the insert-and-lock process 500 advances to a 'create new group' procedure 519 that creates a new group. Once the new group is created the insert-and-lock process 500 continues to an 'assign object-of-interest to new or selected group (assigned group)' procedure 521. The 'assign object-of-interest to group' procedure 521 is subsequently described.

Figure 5B:
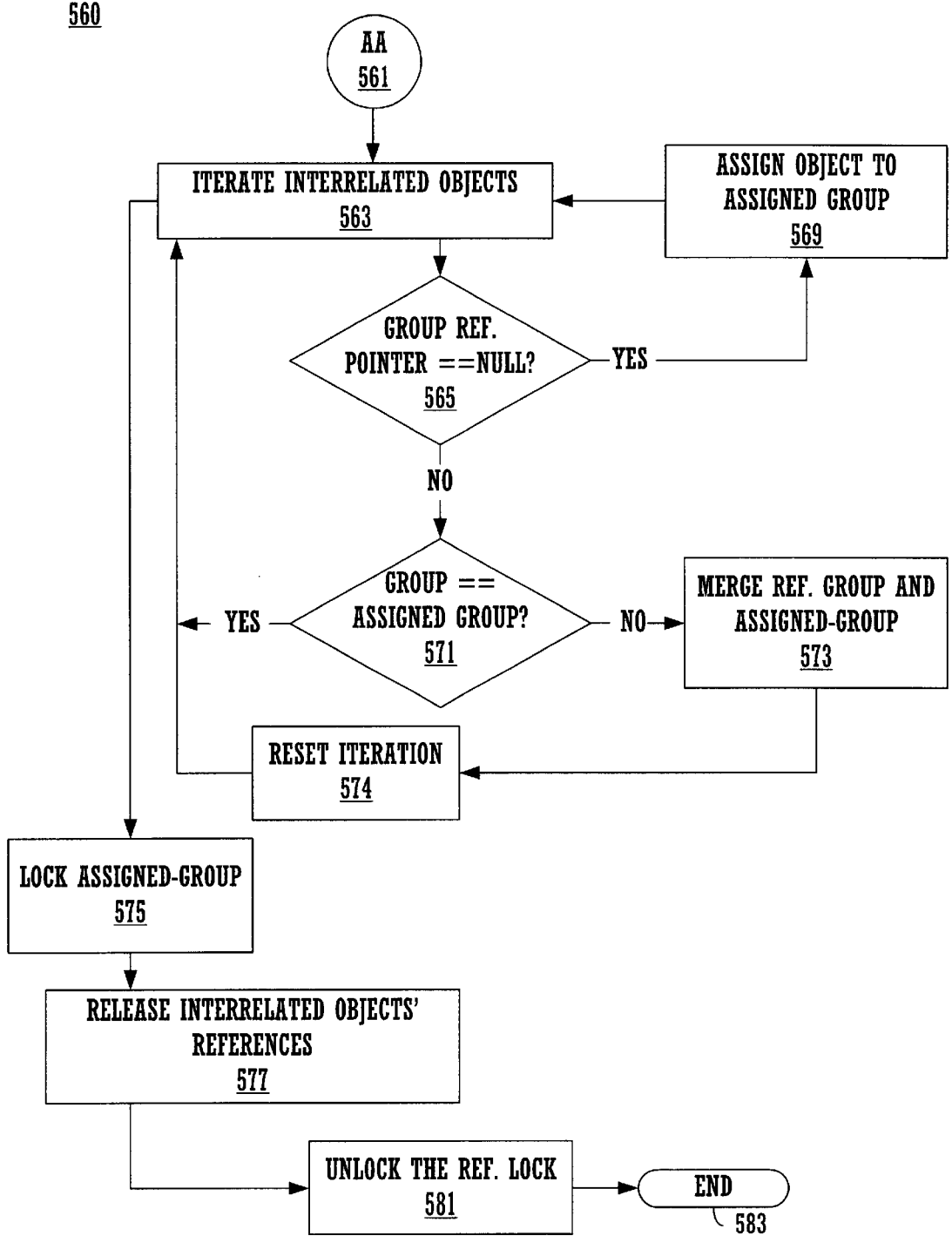

However, if the 'all group reference pointers NULL' decision procedure 517 found a non-NULL group reference pointer (which means that one of the interrelated objects is already part of a group) the insert-and-lock process 500 continues to a 'select group' procedure 523. The 'select group' procedure 523 selects any group from the group reference pointers gathered from the 'gather group reference pointers' procedure 515. The insert-and-lock process 500 then continues to the 'assign object-of-interest to group' procedure 521. The 'assign object-of-interest to group' procedure 521 assigns the group to either the new group created by the 'create new group' procedure 519 or the group selected by the 'select group' procedure 523. This group is now termed the "assigned group". Next, the insert-and-lock process 500 continues through a "go to AA' terminal 527 that continues the insert-and-lock process 500 at FIG. 5B FIG. 5B illustrates a continuation of the insert-and-lock process, indicated by general reference character 560, that continues the insert-and-lock process 500 of FIG. 5A. The insert-and-lock process continues at an 'AA continuation' terminal 561 from the "go to AA' terminal 527. The insert-and-lock process continues to an 'iterate interrelated objects' procedure 563 that iterates each group reference pointer from each interrelated object. As each group reference pointer is iterated, the insert-and-lock process continues to a 'group reference pointer NULL' decision procedure 565 that determines whether the group reference pointer is NULL. If the group reference pointer is NULL, the associated object is not assigned to a group. Thus, an 'assign object to assigned group' procedure 569 sets the 'group reference pointer' field 331 of the associated object to point to the 'group lock pointer' object 304 for the group assigned to the object-of-interest. Then, the insert-and-lock process continues to the 'iterate interrelated objects' procedure 563 to iterate other group reference pointers.

However, if the group reference pointer is not NULL at the 'group reference pointer NULL' decision procedure 565, the insert-and-lock process continues to a 'group is assigned group' decision procedure 571 that determines whether the group associated with the interrelated object is the same group as was assigned to the object-of-interest. Next the insert-and-lock process continues to the 'iterate interrelated objects' procedure 563 to iterate other group reference pointers.

However, if the group reference pointer is not NULL and is not the same as the assigned group the insert-and-lock process continues to a 'merge assigned-group and referenced group' procedure 573, subsequently described with respect to FIG. 6, that merges the two groups. Once the two groups are merged, a 'reset iteration' procedure 574 resets the iteration of the 'iterate interrelated objects' procedure 563 so that all the group reference pointers from the newly merged group are iterated. Thus, the 'merge assigned-group and referenced group' procedure 573 may be again invoked to merge other groups with the just merged group.

Once the 'iterate interrelated objects' procedure 563 completes the insert-and-lock process continues to a 'lock assigned group' procedure 575 that locks the group assigned to the object-of-interest. Once the group is locked, a 'release interrelated objects' references' procedure 577 again iterates through the list of non-NULL group pointers and releases each group. Once the appropriate groups are released, an 'unlock reference lock' procedure 581 again unlocks the 'reference lock' object 301. Then the insert-and-lock process completes through an 'end' terminal 583 returning the locked and assigned group that contains the object-of-interest.

Figure 6:
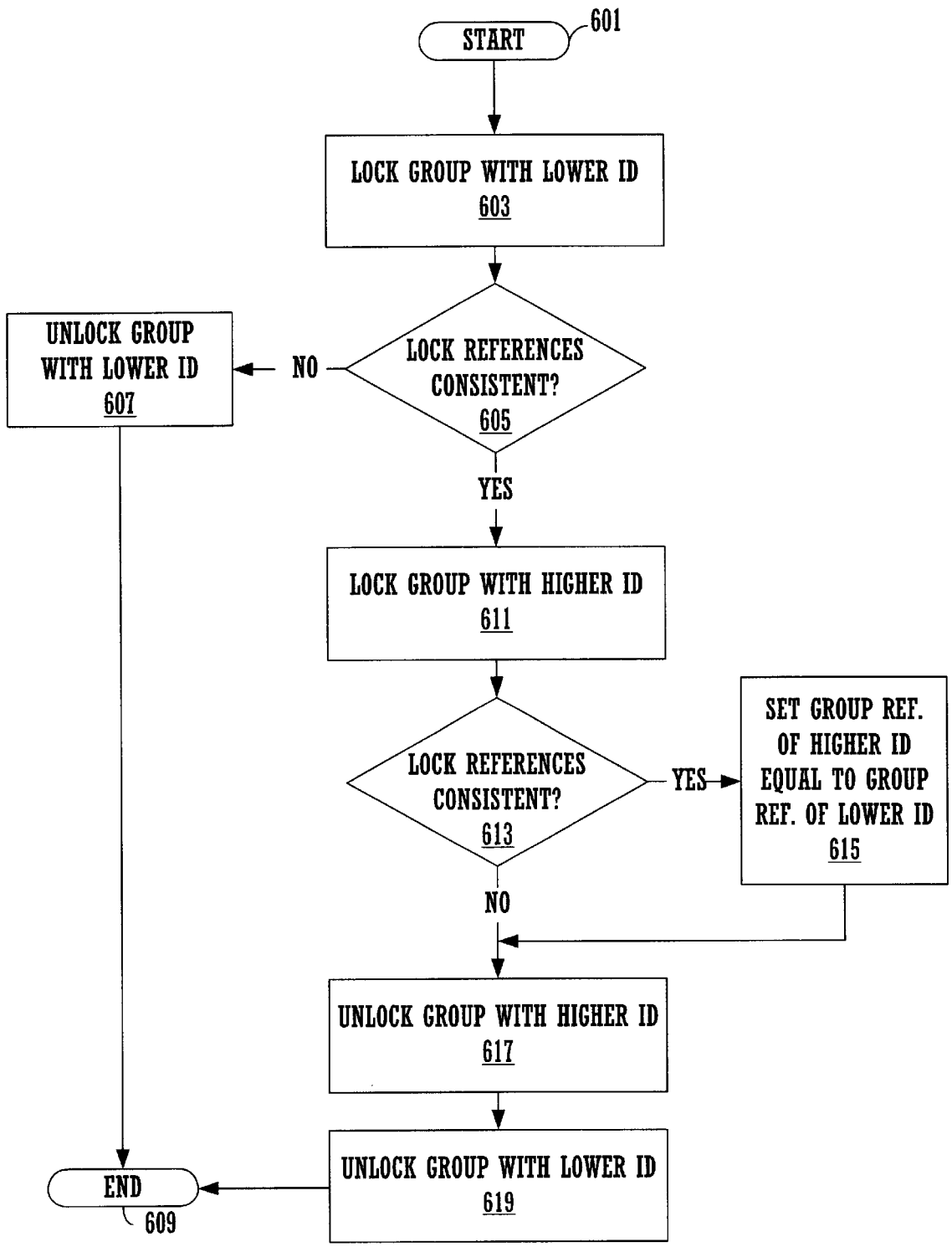
FIG. 6 illustrates a group merge process in accordance with a preferred embodiment.

FIG. 6 illustrates a group merge process, indicated by general reference character 600, for merging two groups have become interrelated. The group merge process 600 is invoked by the 'merge assigned-group and referenced group' procedure 573 of FIG. 5B and initiates at a 'start' terminal 601. Then the group merge process 600 continues to a 'lock older group' procedure 603 that locks the group having the lower identification value in the 'group lock identification' field 325. The well-known locking procedure is subsequently described with respect to FIG. 7A and FIG. 7B. Next, a 'lock check' decision procedure 605 determines whether the relevant linkages have been changed by another thread while the older group was being locked. If the relevant linkages have been changed, the group merge process 600 continues to an 'unlock older group' procedure 607 that unlocks the older group. In this circumstance the group merge process 600 completes through an 'end' terminal 609. One skilled in the art will understand that because the 'reset iteration' procedure 574 is always invoked after the 'merge assigned-group and referenced group' procedure 573 that the locking inconstancy that invoked the 'unlock older group' procedure 607 will be subsequently retried.

However, if the older group was locked and the relevant linkages are unchanged as determined by the 'lock check' decision procedure 605, the group merge process 600 continues to a 'lock newer group' procedure 611 that locks the group with the higher identification value (the newer group). Next, a 'lock check' decision procedure 613 determines whether the relevant linkages have been changed by another thread while the newer group was being locked. If the relevant linkages have not been changed, the group merge process 600 continues to a 'merge newer group with older group' procedure 615 that sets the group reference of the newer group (the group having the larger group lock identification value) to the group lock identification value of the older group. Next the group merge process 600 continues to an 'unlock newer group' procedure 617 that unlocks the newer group and to an 'unlock older group' procedure 619 that unlocks the older group. The group merge process 600 then completes through the 'end' terminal 609.

However if the 'lock check' decision procedure 613 determines the relevant linkages have been changed, the group merge process 600 simply completes through the 'unlock newer group' procedure 617, the 'unlock older group' procedure 619 and the 'end' terminal 609. One skilled in the art will understand that because the 'reset iteration' procedure 574 is always invoked after the 'merge assigned-group and referenced group' procedure 573 that the locking inconstancy detected by the 'lock check' decision procedure 613 will be subsequently retried. One skilled in the art will understand that it is important to lock the group locks in a specific order to avoid possible deadlock conditions.

Figure 7A:
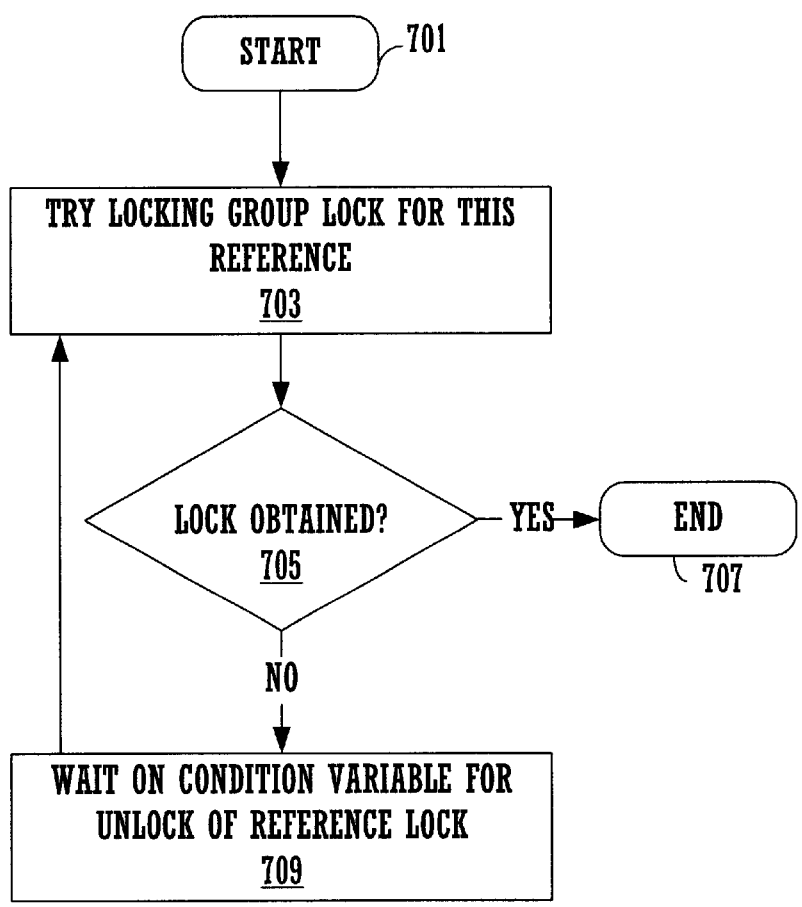
FIG. 7A illustrates a prior art group locking process.

It has been found to be useful to present the prior art locking procedures. FIG. 7A illustrates a group locking process, indicated by general reference character 700, used to lock a group. The group locking process 700 initiates at a 'start' terminal 701 and continues to a 'trylock' procedure 703 that attempts to lock the group lock mutex 321. If the group lock mutex 321 is not already locked by some other thread, the 'trylock' procedure 703 obtains the group lock mutex 321. However, the 'trylock' procedure 703 simply returns if the group lock mutex 321 is already locked. Regardless, a 'lock obtained' decision procedure 705 determines whether the group lock mutex 321 was successfully locked by the 'trylock' procedure 703. If the group lock mutex 321 was successfully locked, the group locking process 700 completes through an 'end' terminal 707. If the group lock mutex 321 was not obtained, the group locking process 700 continues to a 'wait on condition variable' procedure 709 that unlocks the 'reference lock' mutex 309 and sleeps the calling thread dependent on a predicate that the group lock mutex 321 has become unlocked. Once the predicate is satisfied, current thread is continued with the 'reference lock' mutex 309 locked. Once the current thread is continued, the group locking process 700 continues to the 'trylock' procedure 703 to again attempt to lock the group lock mutex 321.

Figure 7B:
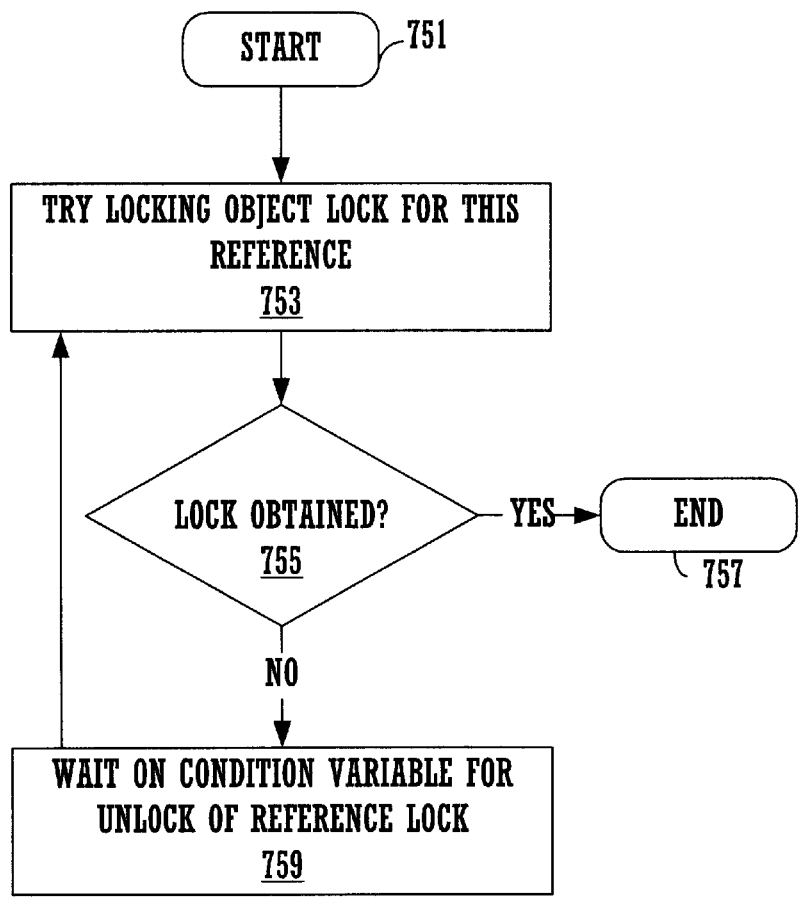
FIG. 7B illustrates a prior art object locking process.

Locking an object is similar to locking a group. FIG. 7B illustrates an object locking process, indicated by general reference character 750, used to lock an object. The object locking process 750 initiates at a 'start' terminal 751 and continues to an 'trylock' procedure 753 that attempts to lock the object lock mutex 329. If the object lock mutex 329 is not already locked by some other thread, the 'trylock' procedure 753 obtains the object lock mutex 329. However the 'trylock' procedure 753 simply returns if the object lock mutex 329 is already locked. Regardless, a lock obtained' decision procedure 755 determines whether the object lock mutex 329 was successfully locked by the 'trylock' procedure 753. If the object lock mutex 329 was successfully locked, the object locking process 750 completes through an 'end' terminal 757. If the object lock mutex 329 was not obtained, the object locking process 750 continues to a 'wait on condition variable' procedure 759 that unlocks the 'reference lock' mutex 309 and sleeps the calling thread dependent on a predicate that the object lock mutex 329 has become unlocked. Once the predicate is satisfied, current thread is continued with the 'reference lock' mutex 309 locked. Once the current thread is continued, the object locking process 750 continues to the 'trylock' procedure 753 to again attempt to lock the object lock mutex 329.

One skilled in the art will understand that the invention maintains one or more groups of interrelated objects or data structures. In a multi-threaded environment, only a single thread can access a group at any given instance. Thus the invention serializes thread access to a minimally sized group to maximize the number of threads that can be used to process the groups of interrelated data structures.

From the foregoing, it will be appreciated that the invention has (without limitation) the following advantages:

1) The invention maintains a minimal group of interrelated objects that are accessed by a thread without interruption by another thread.
2) The invention, by maintaining a minimal group of interrelated objects, does not unnecessarily lock non-interrelated objects and thus unnecessarily block threads.
3) The invention provides an efficient mechanism for merging groups of objects in an object collection.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A method for locking a desired object in a collection of objects for a period of time while locking objects in the collection which are not interrelated with the desired object for a lesser period of time, such method comprising:
   providing a reference lock for the collection of objects to limit access to the collection;
   locking the reference lock to gain initial control of the desired object;
   providing a group lock for the desired object and other objects in the collection which are interrelated with the desired object;
   locking the group lock;
   and unlocking the reference lock to enable access to objects in the collection which are not interrelated with the desired object.

2. The method of claim 1 wherein lock pointers are used to link the desired and interrelated objects to the group lock.

3. The method of claim 2 further comprising modifying the lock pointers for accommodating a change of the relationship between objects.

4. The method of claim 2 further comprising modifying the lock pointers to add a previously non-interrelated object to the group of interrelated objects.

5. The method of claim 1 wherein the desired object is a directed acyclic graph (DAG) object.

6. The method of claim 5 wherein the DAG object describes an image processing operation.

7. A method for locking a desired object in a collection of objects for a period of time while locking objects in the collection which are not interrelated with the desired object for a lesser period of time, such method comprising:
   providing a reference lock for the collection of objects to limit access to the collection;
   locking the reference lock to gain initial control of the desired object;
   identifying other objects in the collection which are interrelated with the desired object;
   providing a group lock for the desired object and the identified interrelated objects;
   locking the group lock;
   and unlocking the reference lock to enable access to objects in the collection which are not interrelated with the desired object.

8. A method for locking a desired object in a collection of objects for a period of time while locking objects in the collection which are not interrelated with the desired object for a lesser period of time, such method comprising:
   providing a reference lock for the collection of objects to limit access to the collection;
   locking the reference lock to gain initial control of the desired object;
   providing group locks for groups of interrelated objects in the collection, one of the groups containing the desired object;
   locking the group lock for the group containing the desired object;
   and unlocking the reference lock to enable access to objects in the collection which are not interrelated with the desired object.

9. The method of claim 8 wherein lock pointers are used to link the objects in the groups to their respective group locks.

10. The method of claim 9 further comprising modifying the lock pointers for accommodating changes in object relationships.

11. The method of claim 9 further comprising modifying the lock pointers to add an object to one of the groups of interrelated objects.

12. The method of claim 9 further comprising modifying the lock pointers for transferring an object from one group to another group.

13. The method of claim 8 further comprising merging two of the groups of interrelated objects, one of which includes the desired object, and providing a single group lock for the merged groups, the locking of the group lock comprising locking the single group lock for the merged group.

14. The method of claim 8 wherein the desired object is a directed acyclic graph (DAG) object.

15. The method of claim 14 wherein the DAG object describes an image processing operation.

16. A system for locking a desired object in a collection of objects for a period of time while locking objects in the collection which are not interrelated with the desired object for a lesser period of time, such system comprising:

a reference locking mechanism for providing a reference lock for the collection of objects to limit access to the collection;

a locking mechanism for locking the reference lock to gain initial control of the desired object;

a group locking mechanism for providing a group lock for the desired object and other objects in the collection which are interrelated with the desired object;

a locking mechanism for locking the group lock;

and an unlocking mechanism for unlocking the reference lock to enable access to objects in the collection which are not interrelated with the desired object.

17. The system of claim 16 wherein lock pointers are used to link the desired and interrelated objects to the group lock.

18. The system of claim 17 further comprising a modification mechanism modifying the lock pointers for accommodating a change of the relationship between objects.

19. The system of claim 17 further comprising a modification mechanism for modifying the lock pointers to add a previously non-interrelated object to the group of interrelated objects.

20. The system of claim 16 wherein the desired object is a directed acyclic graph (DAG) object.

21. The system of claim 20 wherein the DAG object describes an image processing operation.

22. A system for locking a desired object in a collection of objects for a period of time while locking objects in the collection which are not interrelated with the desired object for a lesser period of time, such system comprising:

a reference locking mechanism for providing a reference lock for the collection of objects to limit access to the collection;

a locking mechanism for locking the reference lock to gain initial control of the desired object;

an identifying mechanism for identifying other objects in the collection which are interrelated with the desired object;

a group locking mechanism for providing a group lock for the desired object and the identified interrelated objects;

a locking mechanism for locking the group lock;

and an unlocking mechanism for unlocking the reference lock to enable access to objects in the collection which are not interrelated with the desired object.

23. A system for locking a desired object in a collection of objects for a period of time while locking objects in the collection which are not interrelated with the desired object for a lesser period of time, such system comprising:

a reference locking mechanism for providing a reference lock for the collection of objects to limit access to the collection;

a locking mechanism for locking the reference lock to gain initial control of the desired object;

a group locking mechanism for providing group locks for groups of interrelated objects in the collection, one of the groups containing the desired object;

a locking mechanism for locking the group lock for the group containing the desired object;

and an unlocking mechanism for unlocking the reference lock to enable access to objects in the collection which are not interrelated with the desired object.

24. The system of claim 23 wherein lock pointers are used to link the objects in the groups to their respective group locks.

25. The system of claim 24 further comprising a modification mechanism for modifying the lock pointers for accommodating changes in object relationships.

26. The system of claim 24 further comprising a modification mechanism for modifying the lock pointers to add an object to one of the groups of interrelated objects.

27. The system of claim 24 further comprising a modification mechanism for modifying the lock pointers for transferring an object from one group to another group.

28. The system of claim 23 further comprising a group merging mechanism for merging two of the groups of interrelated objects, one of which includes the desired object, and providing a single group lock for the merged groups, the locking of the group lock comprising locking the single group lock for the merged group.

29. The system of claim 23 wherein the desired object is a directed acyclic graph (DAG) object.

30. The system of claim 29 wherein the DAG object describes an image processing operation.

31. A computer program product comprising:

a computer usable storage medium having computer readable code for locking a desired object in a collection of objects for a period of time while locking objects in the collection which are not interrelated with the desired object for a lesser period of time, such computer readable code comprising:

computer readable code for providing a reference lock for the collection of objects to limit access to the collection;

computer readable code for locking the reference lock to gain initial control of the desired object;

computer readable code for providing a group lock for the desired object and other objects in the collection which are interrelated with the desired object;

computer readable code for locking the group lock;

and computer readable code for unlocking the reference lock to enable access to objects in the collection which are not interrelated with the desired object.

32. The computer program product of claim 31 wherein lock pointers are used to link the desired and interrelated objects to the group lock.

33. The computer program product of claim 32 further comprising computer readable code for modifying the lock pointers for accommodating a change of the relationship between objects.

34. The computer program product of claim 32 further comprising computer readable code for modifying the lock pointers to add a previously non-interrelated object to the group of interrelated objects.

35. The computer program product of claim 31 wherein the desired object is a directed acyclic graph (DAG) object.

36. The computer program product of claim 35 wherein the DAG object describes an image processing operation.

37. A computer program product comprising:

a computer usable storage medium having computer readable code for locking a desired object in a collection of objects for a period of time while locking objects in the collection which are not interrelated with the desired object for a lesser period of time, such computer readable code comprising:

computer readable code for providing a reference lock for the collection of objects to limit access to the collection;

computer readable code for locking the reference lock to gain initial control of the desired object;

computer readable code for identifying other objects in the collection which are interrelated with the desired object;

computer readable code for providing a group lock for the desired object and the identified interrelated objects;

computer readable code for locking the group lock;

and computer readable code for unlocking the reference lock to enable access to objects in the collection which are not interrelated with the desired object.

38. A computer program product comprising:

a computer usable storage medium having computer readable code for locking a desired object in a collection of objects for a period of time while locking objects in the collection which are not interrelated with the desired object for a lesser period of time, such computer readable code comprising:

computer readable code for providing a reference lock for the collection of objects to limit access to the collection;

computer readable code for locking the reference lock to gain initial control of the desired object;

computer readable code for providing group locks for groups of interrelated objects in the collection, one of the groups containing the desired object;

computer readable code for locking the group lock for the group containing the desired object;

and computer readable code for unlocking the reference lock to enable access to objects in the collection which are not interrelated with the desired object.

39. The computer program product of claim 38 wherein lock pointers are used to link the objects in the groups to their respective group locks.

40. The computer program product of claim 39 further comprising computer readable code for modifying the lock pointers for accommodating changes in object relationships.

41. The computer program product of claim 39 further comprising computer readable code for modifying the lock pointers to add an object to one of the groups of interrelated objects.

42. The computer program product of claim 39 further comprising computer readable code for modifying the lock pointers for transferring an object from one group to another group.

43. The computer program product of claim 38 further comprising computer readable code for merging two of the groups of interrelated objects, one of which includes the desired object, and providing a single group lock for the merged groups, the locking of the group lock comprising locking the single group lock for the merged group.

44. The computer program product of claim 38 wherein the desired object is a directed acyclic graph (DAG) object.

45. The computer program product of claim 44 wherein the DAG object describes an image processing operation.

* * * * *